(No Model.)
J. C. SCHROEDER.
CLAY SCREEN.
No. 503,619. Patented Aug. 22, 1893.
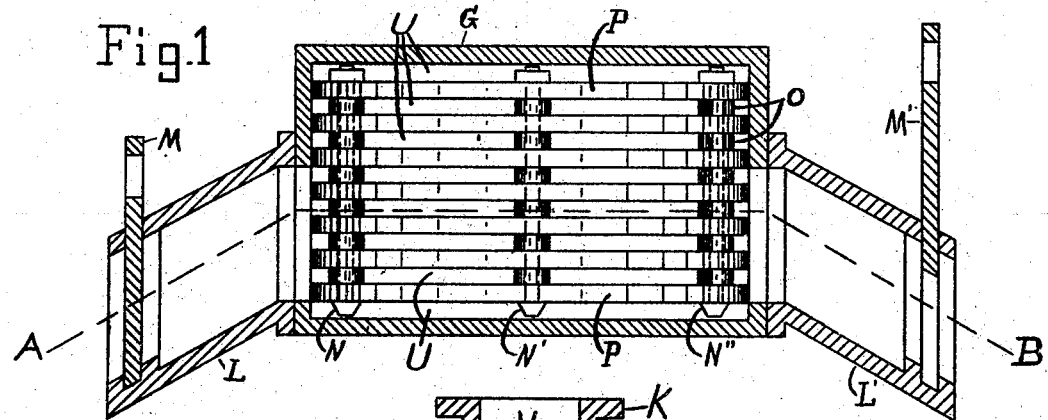
Fig.1
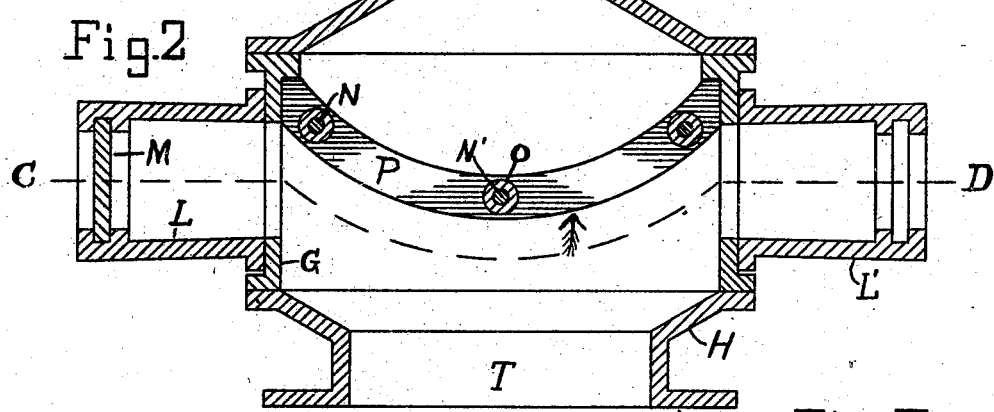
Fig.2
Fig.3
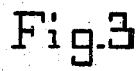
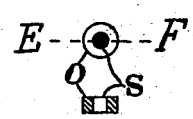
Fig.5
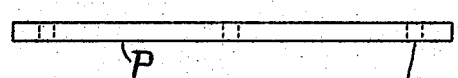
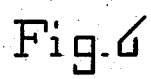
Fig.4
Witnesses.
Richard L. Frost.
Albert U. Mauzy.
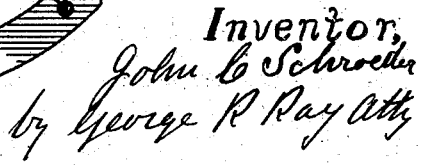
Inventor,
John C. Schroeder
by George R. Ray Atty

UNITED STATES PATENT OFFICE.

JOHN C. SCHROEDER, OF ONEKAMA, MICHIGAN.

CLAY-SCREEN.

SPECIFICATION forming part of Letters Patent No. 503,619, dated August 22, 1893.

Application filed March 29, 1893. Serial No. 468,231. (No model.)

*To all whom it may concern:*

Be it known that I, JOHN C. SCHROEDER, a citizen of the United States, residing at Onekama, in the county of Manistee and State of Michigan, have invented certain new and useful Improvements in Clay-Screens for Brick and Tile Machinery; and I do hereby declare that the following is a full, clear, and exact description of the invention, which will enable others skilled in the art to which it appertains to make and use the same.

My invention has for its object to provide a clay screen which will be simple in construction and operation, and also strong, durable, and efficient.

The main object of my invention is to provide a screen which will separate or screen clay from all stones or other hard substances that are detrimental in the clay when it is made into brick or tile.

A further object of my invention is to provide for the enlarging or reducing of the openings in the screen portion through which the clay passes to any desired size. This object is accomplished by making the screen portion of thin curved strips of iron or other suitable material and separating them by washers or collars of any desired thickness to correspond with the desired size of the opening in the said screen through which the clay passes.

A further object is to provide for the disposing of the stones or other substances that are screened or separated from the clay that passes through said screen. This is accomplished by placing a receiver or pipe on each end of the screen box into which the stones or other substances collect.

The details of the invention will be hereinafter particularly described and pointed out in the claims.

Referring to the accompanying drawings:—
Figure 1 represents a vertical section of my clay screen on the line C, D, of Fig. 2 and looking in the direction of the arrow. Fig. 2 represents a horizontal section of my clay screen on the line A, B, of Fig. 1 and looking downward. Fig. 3 represents a detailed longitudinal edge view of one of the screen slats of the screen portion. Fig. 4 represents a detailed longitudinal side view of Fig. 3. Fig. 5 represents a detailed side view of one of the washers or collars used between the screen slats to separate them. Fig. 6 represents a detailed section of Fig. 5 on the line E, F.

In the drawings similar letters refer to similar parts throughout the several views.

Referring to the drawings G, in Figs. 1 and 2, is a cast iron box forming the main body portion of the clay screen.

H in Fig. 2 is a distance piece or casting through which the clay to be screened enters the main body portion G. The flange J is to be securely fastened to the exit orifice of an ordinary pug-mill.

I, in Fig. 2 is a distance-piece or casting through which the clay passes after having been screened. To the flange K, may be fastened any form or style of brick or tile dies.

L, and L' in Figs. 1 and 2 represent a receiver or pipe, one on each end of the said main box portion G, and securely fastened thereto, which is for the purpose of collecting the stones or other substances that are too large to pass through the openings in the screen.

M, and M' in Figs. 1, and 2, represent valves which are properly fitted in the ends of the receivers or pipes L, and L' respectively and arranged to be opened by lifting them up to remove the stones and other substances contained therein.

N, N', and N'' in Figs. 1 and 2 represent bolts and may be rivets.

O, O, in Figs. 1, 2, 5, and 6 represent collars or washers with a hole S in the center to receive the bolts or rivets N, N', and N''.

P, P, in Figs. 1, 2, 3, and 4 represent slats made of strips of iron and curved edgewise, with the holes R, R, and R to receive the bolts or rivets N, N', and N''.

The screen within the main body portion G, is formed by taking the necessary number of these slats P, P, and separating them by the collars or washers O, O, the said collars or washers O, O, to be of a thickness to correspond with the desired coarseness or fineness of the screen desired.

The slats P, P, and the collars or washers O, O, are securely fastened together by the bolts or rivets N, N', and N'' which pass through the holes R, R, and R and the holes S, S, and S in the said slats P, P, and in the said collars or washers O, O, respectively.

The operation of my clay screen is as follows:—Connect the opening T in the distance piece or casting H to the exit orifice of an ordinary pug-mill, and as the clay, stones and other substances are forced by the pug-mill into the screen box portion G in front of the said screen, will fill all the space and also the receivers or pipes L, and L'. The clay is thence forced through the openings U in the said screen and out through the openings V in the casting I and thence on through any brick or tile die or wherever the operator desires to convey the screened clay. The stones and other substances being too large to pass through the openings in the screen work around and into the receivers or pipes L, and L', and displace a corresponding amount of the clay in the said receivers or pipes L, and L' until the said receivers or pipes L, and L' become full of stones and other substances. Then by opening the valves M and M' the receivers or pipes L and L' can be easily and quickly emptied.

Having fully described my invention, what I claim, and desire to secure by Letters Patent, is—

1. In a clay screen, the combination, of the main body portion G, with the slats P, the collars or washers O, the bolts or rivets N, and the pipes L, all substantially as and for the purpose described.

2. The combination, in a clay screen, of the screen composed of the slats P, the collars or washers O, and the bolts or rivets N, with the main body portion G, the pipes L, and the valves M, all substantially as and for the purpose described.

JOHN C. SCHROEDER.

Witnesses:
GEO. M. BURR,
RICHARD L. FROST.